United States Patent Office 3,298,998
Patented Jan. 17, 1967

3,298,998
BISGLYCIDYL ETHERS OF BISPHENOLS
Richard L. McConnell and Harry W. Coover, Jr., Kingsport, Tenn., assignors to Eastman Kodak Company, Rochester, N.Y., a corporation of New Jersey
No Drawing. Filed Mar. 7, 1961, Ser. No. 93,866
5 Claims. (Cl. 260—47)

This invention relates to new compositions of matter and to their preparation. More particularly, the invention relates to the preparation of new bisglycidyl ethers derived from bisphenols in which both phenol groups are attached to the same carbon atom which may form part of a ring structure.

So far as is known, the prior art does not disclose the ethers which are subject of this invention or any closely related compounds. Thus, as will be seen, the bisglycidyl ethers of this invention are new and useful compositions of matter not heretofore available.

This invention has as its principal object the preparation of bisglycidyl ethers of certain diphenols which are especially valuable for the preparation of epoxy resins.

Another object is to provide bisglycidyl ethers of bisphenols which can be employed in the preparation of epoxy resins having excellent thermal stability.

Another object is to provide bisglycidyl ethers of bisphenols which can be employed as intermediates in the preparation of epoxy resins which have excellent adhesive properties.

A further object is to provide bisglycidyl ethers of bisphenols which are useful as stabilizers for various plastic materials such as poly(vinyl chloride) and cellulose esters.

Other objects will appear hereinafter.

These and other objects of the invention are accomplished, according to one embodiment thereof, by treating a bisphenol with epichlorohydrin or epibromohydrin in the presence of sodium hydroxide. The reaction may be illustrated by the following equation in which 4,4'-(2-norcamphanylidene)diphenol is reacted with epichlorohydrin to give 2,2,-bis[p-(2-3-epoxy-propoxy)phenyl]-norcamphane.

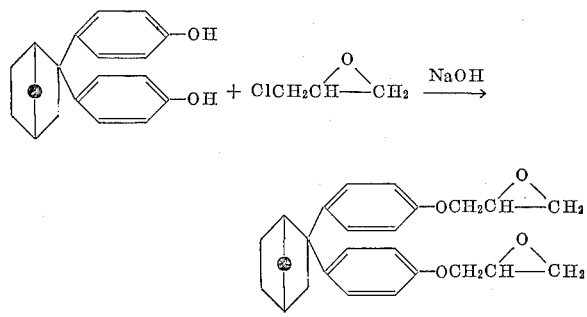

In carrying out this reaction, it is preferable to employ a slight excess of epichlorohydrin or epibromohydrin although stoichiometric amounts of the reagents may be employed if desired. The reaction can be effected at a temperature of 25 to 125° C., and continued for a period of 1 to 8 hrs. Although solvents are not required for this reaction, various inert solvents such as diethyl ether, dibutyl ether, toluene, xylene, benzene, esters such as ethyl acetate, butyl acetate, isobutyl acetate, ethyl isobutyrate and isobutyl isobutyrate may be employed if desired. The advantage to be obtained by the employment of such solvents is merely to maintain a fluid reaction mixture.

The raw materials which are employed to produce the new bisglycidyl ether compounds of this invention are bisphenols which correspond to the following structural formula:

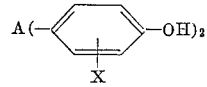

in which A may be a norcamphanylidene group

cyclohexylidene group

hexahydro-4,7-methanoindanylidene group

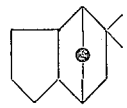

hexahydro-4,7-methanoindanylmethylene groups

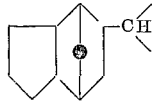

and methylnorcamphanylmethylene groups

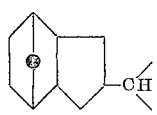

cyclohexylmethylene group methylcyclohexylmethylene groups decahydro-1,4,5,8-dimethanonaphthylidene group

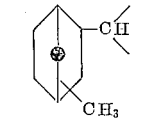

or a decahydro-1,4,5,8-dimethanonaphthylmethylene group

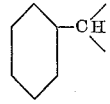

and X is a hydroxy atom or a methyl group.

Bisphenols which may be employed with especially good results in the preparation of bisglycidyl ethers of this invention are:

4,4'-(2-norcamphanylidene) diphenol, M.P. 140–190° C. (The M.P. depends on the rate of heating and loss of water of hydration.)
4,4'-(cyclohexylidene) diphenol, M.P. 183–185° C.
4,4'-(hexahydro-4,7-methanoindan-5-ylidene) diphenol monohydrate, M.P. 221–223° C.
4,4'-(hexahydro-4,7-methanoindan-5-ylidene) di-o-cresol, M.P. 208–210° C.
4,4' - (3 - methylnorcamphan - 2 - ylmethylene) diphenol, M.P. 222–224° C.

Other bisphenols falling within the category represented by the above structural formula and useful as starting materials for production of the new bisglycidyl ether compounds of the above invention are:

4,4'-(hexahydro-4,7-methanoindan-5-ylidene) di-m-cresol
4,4'-(3-methylnorcamphan-2-ylmethylene) di-o-cresole
4,4'-(2-methylnorcamphan-2-ylmethylene) diphenol
4,4'-(2-methylnorcamphan-2-ylmethylene) di-o-cresole
4,4'-(3-methyl-2-norcamphanylidene) diphenol
4,4'-(3-methyl-2-norcamphanylidine) di-o-cresol
4,4'-(2-norcamphanylidene) di-o-cresole
4,4'-(cyclohexylmethylene) diphenol
4,4'-(cyclohexylmethylene) di-o-cresole
4,4'-(1-methylcyclohexylmethylene) diphenol
4,4'-(1-methylcyclohexylmethylene) di-o-cresol
4,4'-(2-methylcyclohexylmethylene) diphenol
4,4'-(2-methylcyclohexylmethylene) di-o-cresole
4,4' - (decahydro - 1,4,5,8 - dimethanonapth - 2 - ylmethylene) diphenol
4,4' - (decahydro - 1,4,5,8-dimethanonaphth - 2 - ylmethylene) di-o-cresol
4,4' - (decahydro - 1,4,5,8-dimethanonapth - 2 - ylidene) diphenol
4,4' - (decahydro - 1,4,5,8-dimethanonapth - 2 - ylidene) di-o-cresol
4,4' - (hexahydro - 4,7 - methanoindan - 2 - ylmethylene) diphenol
4,4' - (hexahydro - 4,7 - methanoindan - 2 - ylmethylene) di-o-cresol
4,4'-(hexahydro-4,7-methanoindan-2-ylidene) diphenol
4,4'-(hexahydro-4,7-methanoindan-2-ylidene) di-o-cresol The bisphenols used as starting materials are readily prepared in 70–90% yields by treating the appropriate ketone or aldehyde with phenol or cresol in the presence of hydrochloric acid and β-mercaptopropionic acid.

The prepartion of a typical compound, 4,4'-(2-norcamphanylidene) diphenol, will serve to illustrate the general procedure which may be employed for preparing any of the above mentioned diphenol starting materials.

A mixture containing 55 g. (0.50 mole) of norcamphor, 188 g. (2.0 moles) of phenol, 125 g. of concentrated hydrochloric acid, and 2.5 g. of β-mercaptopropionic acid was stirred at 25° C. for 48 hours. The lower aqueous layer was decanted from the upper semisolid organic layer. The organic layer was washed twice with 500 ml. of hot water (70–80° C.) to remove the excess phenol. The crude yield was 127–140 g. (85–94% calculated as the monohydrate). The crude bisphenol melted in the 140–190° C. range depending upon the rate of heating and loss of water of hydration. The compound, 4,4'-(2-norcamphanylidene) diphenol, can be recrystallized from mixtures of acetic acid and water, or isopropanol and water.

The reaction for preparation of these bisphenols may be represented by the following equation:

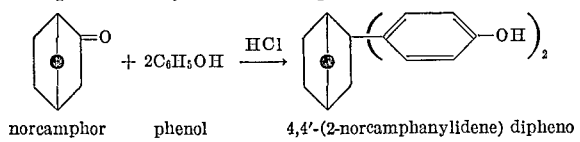

norcamphor    phenol    4,4'-(2-norcamphanylidene) dipheno

Other diphenols such as those listed above may be prepared in a similar manner.

The new bisglycidyl ethers of bisphenols of our invention can thus be illustrated by the following structural formula:

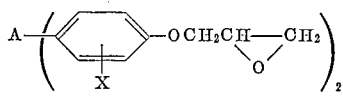

Wherein A is a substituent selected from the group consisting of a norcamphanylidene group

cyclohexylidene group

hexahydro-4,7-methanoindanylidene group

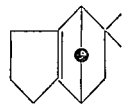

hexahydro-4,7-methanoindanylmethylene groups

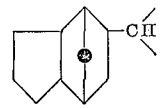

and

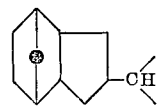

methylnorcamphanylmethylene groups

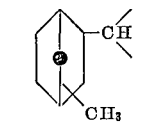

cyclohexylmethylene group

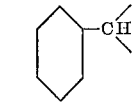

methylcyclohexylmethylene groups

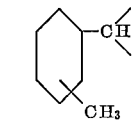

decahydo-1,4,5,8-dimethanonaphthylidene group

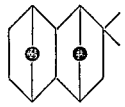

decahydro-1,4,5,8-dimethanonaphthylmethylene group

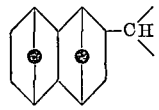

wherein X is a hydrogen atom or a methyl group.

In the following examples and description we have set forth several of the preferred embodiments of our invention, but they are inclined merely for purposes of illustration and not as a limitation thereof.

Example 1.—Preparation of 2,2-bis[p-(2,3-epoxypropoxy)phenyl]-norcamphane

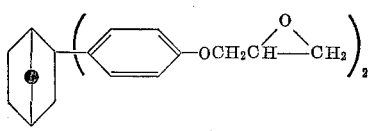

Epichlorohydrin (37 g., .4 mole), 4,4'-(2-norcamphylidene)diphenol monohydrate (29.8 g., .1 mole) were placed in a 300 ml. flask and stirred with a high-speed stirrer. The reaction mixture was heated to 70° and 16 g. of a 50% sodium hydroxide solution was added dropwise over a 20-minute period. The reaction was exothermic and the temperature rose to 95° C. for a short period of time. Ten ml. of water was added and then the reaction mixture was heated for 3½ hrs. in the 70–90° C. range. After cooling the reaction mixture, 200 ml. of ether was added and stirred well. The aqueous solution was drained off and the ether solution was washed three times with water. After drying the ether solution over sodium sulfate, the ether was stripped off on the steam bath at atmospheric pressure. Finally, the product was stripped in vacuo to a pot temperature of 50° C. and a pressure of 2 mm. The product is an extremely viscous, straw-colored material and amounted to 41.4 g. It had an oxirane oxygen content of 6.2%.

Example 2.—Preparation of bis[p-(2,3-epoxypropoxy)phenyl]cyclohexane

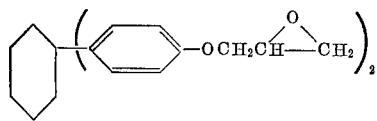

This diepoxide was prepared from 4,4'-(cyclohexylidene)-diphenol, epichlorohydrin and aqueous sodium hydroxide according to the procedure of Example 1. The product had an oxirane oxygen content of 7.6%.

Example 3.—Preparation of 5,5-bis[2,3-epoxypropoxy)phenyl]hexahydro-4,7-methanoindane

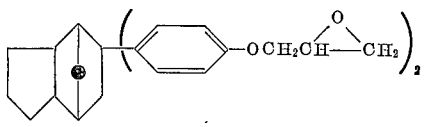

This extremely viscous product was prepared from 4,4'-(hexahydro - 4,7 - methanoindan - 5 - ylidene)diphenol, epichlorohydrin and aqueous sodium hydroxide, according to the procedure of Example 1. It had an oxirane oxygen content of 6.7%.

Example 4.—Preparation of 2,2-bis[4-(2,3-epoxypropoxy)-3-methylphenyl]hexahydro-4,7-methanoindane

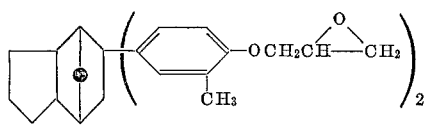

This diepoxide was prepared from 4,4'-(hexahydro-4,7-methanoindan-5-ylidene)di-o-cresol, epibromohydrin, and aqueous potassium hydroxide according to the procedure of Example 1. The oxirane oxygen content was 5.9%.

Example 5.—Preparation of 2-bis[p-(2,3-epoxypropoxy)phenyl]-methylene-3-methylnorcamphane

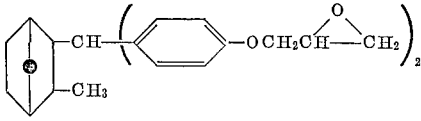

This viscous material was prepared from 4,4'-(3-methylnorcamphan-2-ylmethylene)diphenol, epichlorohydrin and aqueous sodium hydroxide according to the procedure of Example 1. Th oxirane oxygen content was 6.8%.

Example 6.—Preparation of resins derived from 2,2-bis[p-(2,3-epoxypropoxy)phenyl]norcamphane 2,2 - bis[p - (2,3 - epoxypropoxy)phenyl]norcamphane (39.2 g.) and adipic acid (7.3 g.) were mixed with stirring and heated at 130° C. for 8 hours to produce a straw-colored, transparent resin which is extremely hard.

Example 7

A similar resin was obtained by treating 2,2-bis[p-(2,3-epoxypropoxy)phenyl]norcamphane (9.8 g.) with maleic anhydride (1.7 g.) and neopentyl glycol (0.2 g.). This resin is amber, hard and transparent.

Example 8

The epoxy compound of Example 6 may also be condensed with polyamines. For example, an amber, transparent resin was obtained when 2,2-bis[p-(2,3-epoxypropoxy)phenyl]norcamphane (9.8 g.) was treated with diethylenetriamine (1.0 g.) at 130° C. for several hours. Resins similar to those described in Examples 6, 7, and 8 were prepared from compounds described in Examples 2 through 5 above.

As indicated in Examples 6, 7 and 8, the bisglycidyl ethers of bisphenols of the present invention lend themselves readily to the preparation of resins by the use of certain modifying agents. For example, in Example 6 adipic acid has been used to illustrate this action. However, other dibasic acids such as maleic, fumaric, glutaric, succinic, sebacic, isosebacic and suberic acids may be employed. As is well-known, these dibasic acids will modify the polyethers in such a way as to produce resins with particularly preferred properties. In a similar manner, acid anhydrides and glycols may be used to modify the resins. In addition to maleic anhydride and neopentyl glycol which are used for purposes of illustration in Example 7, other anhydrides such as succinic anhydride and phthalic anhydride and other polyols such as ethylene glycol, trimethylene glycol, tetramethylene glycol, pentamethylene glycol, cyclohexanedimethanol, pentaerythritol, etc., can be used. In addition to diethylenetriamine used in Example 8, other polyamines such as triethylenetetramine, 1,6 - hexanediamine, cyclohexanebismethylamine, etc., may be used.

As indicated in the above examples and description, the novel epoxides of this invention are valuable intermediates for the preparation of a wide range of epoxy resins. For example, these new epoxy compounds may be treated with anhydrides, polyhydroxy compounds or polyamines to produce hard, cross-linked resins. These epoxy resin formulations are extremely valuable for coating compositions, potting compositions and casting materials. For example, when employing these resin compositions as coating materials, the compositions which are in liquid form are applied to the surface desired to be coated and cured under the influence of either heat or catalyst or both. Polymerization and cross-linking occur with the result that a hard, infusible and insoluble coating is produced. Similarly, when these resin compositions are applied as potting compositions or as casting materials, the same phenomena of polymerization and cross-linking takes place to produce the desired hard, infusible material required. The epoxy resin compositions produced from the epoxides of this invention also have excellent adhesive properties, adhering particularly well to surfaces of glass and various metals. This enables them to be employed in the lamination of glass and also in the repair of damaged metal surfaces such as automobile fenders and the like. The resin composition in the latter case is applied in liquid form on the surface to be treated and then permitted to polymerize and cross-link to form a hard, tough wear-resistant surface.

The diepoxides of this invention are also useful as stabilizers for polymeric materials such as cellulose esters. For example, the diepoxides of the present invention when used in concentrations of 0.1 to about 5% in combination with potassium acid oxalate in concentrations of 0.01 to 0.05% in a plasticized cellulose acetate or cellulose acetate butyrate gives a heat stable cellulose ester composition which will maintain an APHA color of less than 50 when heated at 205° C. for 1 hour in a typical heat test. Without the presence of the stabilizers, the cellulose acetate or cellulose acetate butyrate compositions would be dark brown or black after the usual 1-hour heating at 205° C.

It will thus be apparent from the above examples and description that we have provided a new and valuable class of bisglycidyl ethers not heretofore known which have highly valuable properties in the production of epoxy resins possessing excellent thermal stability and good adhesive properties.

Although the invention has been described in considerable detail with particular reference to certain preferred embodiments thereof, variations and modifications can be effected within the spirit and scope of the invention as described hereinabove, and as defined in the appended claims.

We claim:
1. 2,2-bis[p-(2,3-epoxypropoxy)phenyl]norcamphane.
2. A synthetic resinous polymer comprised of 2,2-bis[p-(2,3-epoxypropoxy)phenyl]norcamphane and a curing agent selected from the group consisting of (1) dicarboxylic acids, (2) dicarboxylic acids mixed with polyhydric alcohols and (3) organic polyamines.
3. A synthetic resinous polymer as defined by claim 2 wherein said curing agent is adipic acid.
4. A synthetic resinous polymer as defined by claim 2 wherein said curing agent is maleic anhydride mixed with neopentyl glycol.
5. A synthetic resinous polymer as defined by claim 2 wherein said curing agent is diethylenetriamine.

References Cited by the Examiner
UNITED STATES PATENTS

| | | | |
|---|---|---|---|
| 2,506,486 | 5/1950 | Bender | 260—47 |
| 2,761,879 | 9/1956 | Soloway | 260—47 |
| 2,811,564 | 10/1957 | Bader | 260—47 |
| 2,935,488 | 5/1960 | Phillips et al. | 260—47 |

OTHER REFERENCES

Karrer: "Organic Chemistry," page 612 relied on, Nordeman Publishing Co. Inc., N.Y., 1938, QD251.K32.

WILLIAM H. SHORT, *Primary Examiner.*
HAROLD BURSTEIN, *Examiner.*
A. LIEBERMAN, T. KERWIN, *Assistant Examiners.*